(12) United States Patent
Takahashi et al.

(10) Patent No.: US 12,507,303 B2
(45) Date of Patent: Dec. 23, 2025

(54) USER EQUIPMENT AND COMMUNICATION METHOD

(71) Applicant: NTT DOCOMO, INC., Tokyo (JP)

(72) Inventors: Hideaki Takahashi, Tokyo (JP); Hiromasa Umeda, Tokyo (JP); Yuta Oguma, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 440 days.

(21) Appl. No.: 17/432,299

(22) PCT Filed: Feb. 25, 2019

(86) PCT No.: PCT/JP2019/007148
§ 371 (c)(1),
(2) Date: Aug. 19, 2021

(87) PCT Pub. No.: WO2020/174552
PCT Pub. Date: Sep. 3, 2020

(65) Prior Publication Data
US 2022/0346170 A1 Oct. 27, 2022

(51) Int. Cl.
*H04W 24/10* (2009.01)
*H04L 65/1069* (2022.01)
(Continued)

(52) U.S. Cl.
CPC ............. *H04W 76/16* (2018.02); *H04W 8/24* (2013.01)

(58) Field of Classification Search
CPC . H04W 72/51; H04W 36/0069; H04W 76/11; H04W 36/0077; H04W 8/22;
(Continued)

(56) References Cited

U.S. PATENT DOCUMENTS

| 6,600,917 B1 * | 7/2003 | Maupin | H04W 48/16 455/414.1 |
| 2016/0270139 A1 * | 9/2016 | Rahman | H04W 76/15 |

(Continued)

FOREIGN PATENT DOCUMENTS

| EP | 3261282 A1 | 12/2017 |
| JP | 2017-069910 A | 4/2017 |

OTHER PUBLICATIONS

Extended European Search Report issued in counterpart European Patent Application No. 19916764.4, mailed on Sep. 6, 2022 (10 pages).

(Continued)

*Primary Examiner* — Marcus Smith
*Assistant Examiner* — Jason A Harley
(74) *Attorney, Agent, or Firm* — Osha Bergman Watanabe & Burton LLP

(57) ABSTRACT

A user equipment includes a receiving unit receiving band information of a RAT1 and a RAT2 from a base station, a control unit determining a parameter1 indicating a supported bandwidth combination (BWC) for the RAT1's part for inter-band EN-DC of the RAT1 and the RAT2 and a parameter2 indicating a BWC supported for all bands of the inter-band EN-DC and the intra-band EN-DC of the RAT1 and the RAT2 for dual connectivity of the RAT1 and the RAT2, the dual connectivity being composed of the inter-band EN-DC and the intra-band EN-DC of the RAT1 and the RAT2, for the band combination of the inter-band EN-DC, any combination of the RAT2's part of the BWC indicated by the parameter1 and the RAT1's part of the BWC indicated by the parameter1 is supported, and a transmitting unit transmitting terminal capability information including the determined parameter1 and parameter2 to the base station.

5 Claims, 13 Drawing Sheets

(51) Int. Cl.
*H04W 8/24* (2009.01)
*H04W 36/06* (2009.01)
*H04W 36/30* (2009.01)
*H04W 72/04* (2023.01)
*H04W 76/16* (2018.01)
*H04W 88/18* (2009.01)

(58) Field of Classification Search
CPC ... H04W 72/563; H04W 72/02; H04W 28/20; H04L 1/1614; H04L 5/001
USPC .......................................... 370/230; 455/525
See application file for complete search history.

(56) References Cited

U.S. PATENT DOCUMENTS

| | | | |
|---|---|---|---|
| 2018/0219652 A1* | 8/2018 | Chen .................... | H04W 88/023 |
| 2018/0220295 A1 | 8/2018 | Takahashi et al. | |
| 2018/0368153 A1* | 12/2018 | Li .......................... | H04W 76/16 |
| 2020/0221469 A1* | 7/2020 | Lee ........................ | H04W 76/36 |
| 2020/0260265 A1* | 8/2020 | Jin .......................... | H04W 8/24 |
| 2020/0351643 A1* | 11/2020 | Dhanapal ............. | H04B 7/0413 |

OTHER PUBLICATIONS

3GPP TS 38.331 V15.4.0; "3rd Generation Partnership Project; Technical Specification Group Radio Access Network; NR; Radio Resource Control (RRC) protocol specification (Release 15)"; Dec. 2018 (474 pages).

Office Action issued in the counterpart Indian Application No. 202117040103, mailed Mar. 10, 2023 (7 pages).

3GPP TS 38.331 V15.4.0 "3rd Generation Partnership Project; Technical Specification Group Radio Access Network; NR; Radio Resource Control (RRC) protocol specification (Release 15)" Dec. 2018 (7 pages).

Notice of Reasons for Refusal issued in Japanese Application No. 2021-501409 mailed on Jun. 28, 2022 (5 pages).

3GPP TS 38.300 V15.3.0, "3rd Generation Partnership Project; Technical Specification Group Radio Access Network; NR; NR and NG-RAN Overall Description; Stage 2 (Release 15)" Sep. 2018 (92 pages).

3GPP TS 37.340 V15.3.0, "3rd Generation Partnership Project; Technical Specification Group Radio Access Network; Evolved Universal Terrestrial Radio Access (E-UTRA) and NR; Multi-connectivity; Stage 2 (Release 15)"; Sep. 2018 (59 pages).

International Search Report issued in corresponding International Application No. PCT/JP2019/007148 mailed May 7, 2019 (6 pages).

Written Opinion of the International Searching Authority issued in corresponding International Application No. PCT/JP2019/007148 mailed May 7, 2019 (4 pages).

Office Action issued in Chinese Application No. 201980092781.2, mailed Nov. 30, 2023 (19 pages).

3GPP TSG-RAN WG2 Meeting #99bis; R2-1710632; Intel Corporation; Email Disc on [99#25][NR] Capability coordination—Part 1; Prague, Czech Republic, Oct. 9-13, 2017 (12 pages).

Office Action issued in European Application No. 19916764.4, dated Nov. 20, 2024 (9 pages).

Office Action issued in Canadian Application No. 3,123,766, dated Jan. 27, 2025 (4 pages).

Office Action issued in New Zealand Patent Application No. 778005, mailed on Oct. 21, 2025 (4 pages).

* cited by examiner

FIG. 3A (TS38.331)

6.3.3 UE capability information elements

— *BandCombinationList*

The IE *BandCombinationList* contains a list of NR CA and/or MR-DC band combinations (also including DL only or UL only band).

— ASN1START
— TAG-BANDCOMBINATIONLIST-START

```
BandCombinationList ::=          SEQUENCE (SIZE (1..maxBandComb)) OF BandCombination BandCombinationList-v1540 ::=    SEQUENCE (SIZE (1..maxBandComb)) OF BandCombination-v1540

BandCombination ::=  SEQUENCE {
    bandList                         SEQUENCE (SIZE (1..maxSimultaneousBands)) OF BandParameters,
    featureSetCombination            FeatureSetCombinationId,
    ca-ParametersEUTRA               CA-ParametersEUTRA                               OPTIONAL,
    ca-ParametersNR                  CA-ParametersNR                                  OPTIONAL,
    mrdc-Parameters                  MRDC-Parameters                                  OPTIONAL,
    supportedBandwidthCombinationSet BIT STRING (SIZE (1..32))                        OPTIONAL,
    powerClass-v1530                 ENUMERATED {pc2}                                 OPTIONAL
}

BandCombination-v1540 ::= SEQUENCE {
    bandList-v1540                   SEQUENCE (SIZE (1..maxSimultaneousBands)) OF BandParameters-v1540,
    ca-ParametersNR-v1540            CA-ParametersNR-v1540                            OPTIONAL
}

BandParameters ::= CHOICE {
    eutra                            SEQUENCE {
        bandEUTRA                    FreqBandIndicatorEUTRA,
        ca-BandwidthClassDL-EUTRA    CA-BandwidthClassEUTRA                           OPTIONAL,
        ca-BandwidthClassUL-EUTRA    CA-BandwidthClassEUTRA                           OPTIONAL
    },
    nr                               SEQUENCE {
        bandNR                       FreqBandIndicatorNR,
        ca-BandwidthClassDL-NR       CA-BandwidthClassNR,
        ca-BandwidthClassUL-NR       CA-BandwidthClassNR                              OPTIONAL
    }
}
```

FIG.3B

```
BandParameters-v1540 ::=      SEQUENCE {
    srs-CarrierSwitch               CHOICE {
        nr                              SEQUENCE {
            srs-SwitchingTimesListNR        SEQUENCE (SIZE (1..maxSimultaneousBands)) OF SRS-SwitchingTimeNR
        },
        eutra                           SEQUENCE {
            srs-SwitchingTimesListEUTRA     SEQUENCE (SIZE (1..maxSimultaneousBands)) OF SRS-SwitchingTimeEUTRA
        }
    }                                                                                       OPTIONAL,
    srs-TxSwitch-v1540              SEQUENCE {
        supportedSRS-TxPortSwitch       ENUMERATED {t1r2, t1r4, t2r4, t1r4-t2r4, t1r1, t2r2, t4r4, notSupported},
        txSwitchImpactToRx              INTEGER (1..32)                                     OPTIONAL,
        txSwitchWithAnotherBand         INTEGER (1..32)                                     OPTIONAL
    }                                                                                       OPTIONAL
}

-- TAG-BANDCOMBINATIONLIST-STOP
-- ASN1STOP
```

FIG. 3C

| BandCombinationList-v1540 |
|---|
| BandCombinationList-v1540<br>The UE shall include the same number of entries, and listed in the same order, as in BandCombinationList (without suffix).<br>powerClass<br>Power class that the UE supports when operating according to this band combination. If the field is absent, the UE supports the default power class. If this power class is higher than the power class that the UE supports on the individual bands of this band combination (ue-PowerClass in BandNR), the latter determines maximum TX power available in each band. The UE sets the new power class parameter only in band combinations with two FR1 uplink serving cells.<br>supportedBandwidthCombinationSet<br>For NR SA and for inter-band EN-DC, the field defines the bandwidth combinations for the NR part of the band combination. For intra-band EN-DC, the field indicates the supported bandwidth combination set applicable to the NR and LTE band combinations. The first (left-most) bit in the bitmap corresponds to the BWCS#0 and so on. If the bit is set to 1, the UE supports the corresponding BWCS. For an inter-band EN-DC band combination, the UE shall support any combinations of the NR part of bandwidth combination set indicated by supportedBandwidthCombinationSetEUTRA. For a EN-DC band combination comprised of inter-band EN-DC and intra-band EN-DC, this field indicates the supported bandwidth combination set across all the inter and intra-band EN-DC bands.<br>srs-SwitchingTimesListNR<br>Indicates, for a particular pair of NR bands, the RF retuning time when switching between a NR carrier corresponding to this band entry and another (PUSCH-less) NR carrier corresponding to the band entry in the order indicated below:<br>- For the first NR band, the UE shall include the same number of entries for NR bands as in bandList i.e. first entry corresponds to first NR band in bandList and so on.<br>- For the second NR band, the UE shall include one entry less i.e. first entry corresponds to the second NR band in bandList and so on<br>- And so on<br>srs-SwitchingTimesListEUTRA<br>Indicates, for a particular pair of E-UTRA bands, the RF retuning time when switching between an E-UTRA carrier corresponding to this band entry and another (PUSCH-less) E-UTRA carrier corresponding to the band entry in the order indicated below.<br>- For the first E-UTRA band, the UE shall include the same number of entries for E-UTRA bands as in bandList i.e. first entry corresponds to first E-UTRA band in bandList and so on.<br>- For the second E-UTRA band, the UE shall include one entry less i.e. first entry corresponds to the second E-UTRA band in bandList and so on<br>- And so on |

CA-BandwidthClassEUTRA

```
-- ASN1START
-- TAG-CA-BANDWIDTHCLASSEUTRA-START

CA-BandwidthClassEUTRA ::=      ENUMERATED {a, b, c, d, e, f, ...}

-- TAG-CA-BANDWIDTHCLASSEUTRA-STOP
-- ASN1STOP
```

CA-BandwidthClassNR

```
-- ASN1START
-- TAG-CA-BANDWIDTHCLASSNR-START
```

FIG. 3D

```
CA-BandwidthClassNR ::=    ENUMERATED (a, b, c, d, e, f, g, h, i, j, k, l, m, n, o, p, q, ...)
-- TAG-CA-BANDWIDTHCLASSNR-STOP
-- ASN1STOP
```

CA-ParametersEUTRA

The IE *CA-ParametersEUTRA* contains the E-UTRA part of band combination parameters for a given MR-DC band combination.

NOTE: If an additional E-UTRA band combination parameters are defined in TS 36.331 [10], which are supported for MR-DC, they will be defined here as well.

```
-- ASN1START
-- TAG-CA-PARAMETERSEUTRA-START

CA-ParametersEUTRA ::=           SEQUENCE {
    multipleTimingAdvance            ENUMERATED (supported)            OPTIONAL,
    simultaneousRx-Tx                ENUMERATED (supported)            OPTIONAL,
    supportedNAICS-2CRS-AP           BIT STRING (SIZE (1..8))          OPTIONAL,
    additionalRx-TxPerformanceReq    ENUMERATED (supported)            OPTIONAL,
    ue-CA-PowerClass-N               ENUMERATED (class2)               OPTIONAL,
    supportedBandwidthCombinationSetEUTRA-v1630  BIT STRING (SIZE (1..32))  OPTIONAL,
    ...
}

-- TAG-CA-PARAMETERSEUTRA-STOP
-- ASN1STOP
```

| *CA-ParametersEUTRA* field descriptions |
|---|
| *supportedBandwidthCombinationSetEUTRA* Indicates the set of supported bandwidth combinations for the LTE part for inter-band EN-DC. The first (left-most) bit in the bitmap corresponds to the BWCS#0 and so on. If the bit is set to 1, the UE supports the corresponding BWCS. |

FIG. 4A (TS38.331)
6.3.3  UE capability information elements

–  *AccessStratumRelease*

The IE *AccessStratumRelease* indicates the release supported by the UE.

*AccessStratumRelease* information element

```
-- ASN1START
-- TAG-ACCESSSTRATUMRELEASE-START

AccessStratumRelease ::= ENUMERATED {
    rel15, spare7, spare6, spare5, spare4, spare3, spare2, spare1, ...}

-- TAG-ACCESSSTRATUMRELEASE-STOP
-- ASN1STOP
```

–  *BandCombinationList*

The IE *BandCombinationList* contains a list of NR CA and/or MR-DC band combinations (also including DL only or UL only band).

*BandCombinationList* information element

```
-- ASN1START
-- TAG-BANDCOMBINATIONLIST-START

BandCombinationList ::=             SEQUENCE (SIZE (1..maxBandComb)) OF BandCombination
BandCombinationList-v1540 ::=       SEQUENCE (SIZE (1..maxBandComb)) OF BandCombination-v1540
BandCombinationList-v1550 ::=       SEQUENCE (SIZE (1..maxBandComb)) OF BandCombination-v1550

BandCombination ::=   SEQUENCE {
    bandList                              SEQUENCE (SIZE (1..maxSimultaneousBands)) OF BandParameters,
    featureSetCombination                 FeatureSetCombinationId,
    ca-ParametersEUTRA                                                                  OPTIONAL,
    ca-ParametersNR                                                                     OPTIONAL,
    mrdc-Parameters                                                                     OPTIONAL,
    supportedBandwidthCombinationSet      BIT STRING (SIZE (1..32))                     OPTIONAL,
    powerClass-v1530                      ENUMERATED {pc2}                              OPTIONAL
}
```

FIG. 4B

```
BandCombination-v1540 ::=         SEQUENCE {
    bandList-v1540                    SEQUENCE (SIZE (1..maxSimultaneousBands)) OF BandParameters-v1540,
    ca-ParametersNR-v1540                                                         OPTIONAL
}

BandCombinationList-v1540 ::=     SEQUENCE (SIZE (1..maxBandComb)) OF BandCombination-v1540

BandParameters-v1540 ::=         SEQUENCE {
    ca-ParametersNR-v1540                                                         OPTIONAL
}

BandParameters ::=               SEQUENCE {
    CHOICE {
        SEQUENCE {
            bandEUTRA                  FreqBandIndicatorEUTRA,
            ca-BandwidthClassDL-EUTRA  CA-BandwidthClassEUTRA                     OPTIONAL,
            ca-BandwidthClassUL-EUTRA  CA-BandwidthClassEUTRA                     OPTIONAL
        },
        SEQUENCE {
            bandNR                     FreqBandIndicatorNR,
            ca-BandwidthClassDL-NR     CA-BandwidthClassNR                        OPTIONAL,
            ca-BandwidthClassUL-NR     CA-BandwidthClassNR                        OPTIONAL
        }
    }
}

BandParameters-v1540 ::=         SEQUENCE {
    srs-CarrierSwitch              CHOICE {
        nr                             SEQUENCE {
            srs-SwitchingTimesListNR       SEQUENCE (SIZE (1..maxSimultaneousBands)) OF SRS-SwitchingTimeNR
        },
        eutra                          SEQUENCE {
            srs-SwitchingTimesListEUTRA    SEQUENCE (SIZE (1..maxSimultaneousBands)) OF SRS-SwitchingTimeEUTRA
        }
    }                                                                             OPTIONAL,
    srs-TxSwitch-v1540             SEQUENCE {
        supportedSRS-TxPortSwitch      ENUMERATED {t1r2, t1r4, t2r4, t1r4-t2r4, t1r1, t2r2, t4r4, notSupported},
        txSwitchImpactToRx             INTEGER (1..32)                            OPTIONAL,
        txSwitchWithAnotherBand        INTEGER (1..32)                            OPTIONAL
    }                                                                             OPTIONAL
}

-- TAG-BANDCOMBINATIONLIST-STOP
-- ASN1STOP
```

FIG. 4C

| BandCombination field descriptions |
|---|
| *BandCombinationList-v1540* <br> The UE shall include the same number of entries, and listed in the same order, as in *BandCombinationList* (without suffix). <br> *powerClass* <br> Power class that the UE supports when operating according to this band combination. If the field is absent, the UE supports the default power class. If this power class is higher than the power class that the UE supports on the individual bands of this band combination (*ue-PowerClass* in BandNR), the latter determines maximum TX power available in each band. The UE sets the new power class parameter only in band combinations with two FR1 uplink serving cells. <br> *supportedBandwidthCombinationSetIntraMRDC* <br> ~~For NR-CA and for inter-band EN-DC, the field defines the bandwidth combinations for the NR part of the band combination.~~ For intra-band EN-DC, the field indicates the supported bandwidth combination set applicable to the NR and LTE band combinations. The first (left-most) bit in the bitmap corresponds to the BWCS#0 and so on. If the bit is set to 1, the UE supports the corresponding BWCS. For a EN-DC, band combination comprised of inter-band EN-DC and intra-band EN-UL, this field indicates the supported bandwidth combination set across all the inter and intra-band EN-DC bands. <br> For an inter-band EN-DC band combination, the supported band width combinations are any combinations of the NR part of bandwidth combination set indicated by *supportedBandwidthCombinationSetNR* and the E-UTRA part of bandwidth combination set indicated by *supportedBandwidthCombinationSetEUTRA*. <br> *srs-SwitchingTimesListNR* <br> Indicates, for a particular pair of NR bands, the RF retuning time when switching between a NR carrier corresponding to this band entry and another (PUSCH-less) NR carrier corresponding to the band entry in the order indicated below: <br> - For the first NR band, the UE shall include the same number of entries for NR bands as in *bandList* i.e. first entry corresponds to first NR band in *bandList* and so on, <br> - For the second NR band, the UE shall include one entry less i.e. first entry corresponds to the second NR band in *bandList* and so on <br> - And so on <br> *srs-SwitchingTimesListEUTRA* <br> Indicates, for a particular pair of E-UTRA bands, the RF retuning time when switching between an E-UTRA carrier corresponding to this band entry and another (PUSCH-less) E-UTRA carrier corresponding to the band entry in the order indicated below: <br> - For the first E-UTRA band, the UE shall include the same number of entries for E-UTRA bands as in *bandList* i.e. first entry corresponds to first E-UTRA band in *bandList* and so on, <br> - For the second E-UTRA band, the UE shall include one entry less i.e. first entry corresponds to the second E-UTRA band in *bandList* and so on <br> - And so on |

CA-BandwidthClassEUTRA

```
-- ASN1START
BAG-CA-BANDWIDTHCLASSEUTRA-START
CA-BandwidthClassEUTRA ::=            ENUMERATED {a, b, c, d, e, f, ...}
TAG-CA-BANDWIDTHCLASSEUTRA-STOP
-- ASN1STOP
```

CA-BandwidthClassNR

```
-- ASN1START
TAG-CA-BANDWIDTHCLASSNR-START
```

FIG. 4D

```
CA-BandwidthClassNR ::=                    ENUMERATED {a, b, c, d, e, f, g, h, i, j, k, l, m, n, o, p, q, ...}

-- TAG-CA-BANDWIDTHCLASSNR-STOP
-- ASN1STOP
```

—                                    CA-ParametersEUTRA

The IE *CA-ParametersEUTRA* contains the E-UTRA part of band combination parameters for a given MR-DC band combination.

NOTE:    If an additional E-UTRA band combination parameters are defined in TS 36.331 [10], which are supported for MR-DC, they will be defined here as well.

```
-- ASN1START
-- TAG-CA-PARAMETERSEUTRA-START

CA-ParametersEUTRA ::=    SEQUENCE {
    multipleTimingAdvance          ENUMERATED {supported}                OPTIONAL,
    simultaneousRx-Tx              ENUMERATED {supported}                OPTIONAL,
    supportedNAICS-2CRS-AP         BIT STRING (SIZE (1..8))              OPTIONAL,
    additionalRx-TxPerformanceReq  ENUMERATED {supported}                OPTIONAL,
    ue-CA-PowerClass-N             ENUMERATED {class2}                   OPTIONAL,
    supportedBandwidthCombinationSetEUTRA-v1530  BIT STRING (SIZE (1..32))  OPTIONAL,
    ...
}

-- TAG-CA-PARAMETERSEUTRA-STOP
-- ASN1STOP
```

CA-ParametersEUTRA field descriptions

*supportedBandwidthCombinationSetEUTRA*
Indicates the set of supported bandwidth combinations for the LTE part for inter-band EN-DC. The first (left-most) bit in the bitmap corresponds to the BWCS#0 and so on. If the bit is set to 1, the UE supports the corresponding BWCS.

—                                    CA-ParametersNR

The IE *CA-ParametersNR* contains carrier aggregation related capabilities that are defined per band combination.

CA-ParametersNR information element

```
-- ASN1START
-- TAG-CA-PARAMETERSNR-START

CA-ParametersNR ::=    SEQUENCE {
    multipleTimingAdvances         ENUMERATED {supported}                OPTIONAL,
    parallelTxSRS-PUCCH-PUSCH      ENUMERATED {supported}                OPTIONAL,
```

FIG. 4E

USER EQUIPMENT AND COMMUNICATION METHOD

TECHNICAL FIELD

The present invention relates to a user equipment and a communication method in a wireless communication system.

BACKGROUND ART

Currently, in Third Generation Partnership Project (3GPP), specification of a new wireless communication system called a New Radio Access Technology (NR) system as a successor to a Long Term Evolution (LTE) system and an LTE-Advanced system is being developed (for example, Non-Patent Document 1).

In the NR system, similarly to dual connectivity in the LTE system, a technique called LTE-NR dual connectivity or Multi RAT dual connectivity (hereinafter, "MR-DC") of dividing data between a base station (eNB) of the LTE system and a base station (gNB) of the NR system and simultaneously transmitting and receiving data through the base stations is discussed (for example, Non-Patent Document 2). Multi-RAT is an abbreviation for multi radio access technology.

CITATION LIST

Non-Patent Document

Non-Patent Document 1: 3GPP TS 38.300 V15.3.0 (2018-09)
Non-Patent Document 2: 3GPP TS 37.340 V15.3.0 (2018-09)

SUMMARY OF THE INVENTION

Problem to be Solved by the Invention

In the MR-DC, an indication of a list in which a band specified by Evolved Universal Terrestrial Radio Access (E-UTRA) and a band specified by NR are mixed is given to a user equipment. The user equipment determines a bandwidth combination which the user equipment supports from the list. Here, a band combination of inter-band multi-RAT dual connectivity (inter-band EN-DC) and intra-band multi-RAT dual connectivity (intra-band EN-DC) of E-UTRA and NR is considered as a band combination serving as a bandwidth combination target supported by the user equipment.

A method of indicating a bandwidth combination (bandwidth combination set (BWCS)) for the band combination of the inter-band EN-DC and the intra-band EN-DC from the user equipment to the base station device is not specified.

The present invention was made in light of the foregoing, and it is an object of the present invention to provide a technique of indicating the bandwidth combination for the band combination of the inter-band EN-DC and the intra-band EN-DC from the user equipment to the base station device in a wireless communication system using multiple RATs (E-UTRA and NR).

Means for Solving Problem

According to the disclosed technology, a user equipment includes a receiving unit that receives band information of a first radio access technology (RAT) and a second RAT from a base station device, a control unit that determines a first parameter indicating a supported bandwidth combination for the first RAT's part for inter-band dual connectivity (inter-band EN-DC) of the first RAT and the second RAT and a second parameter indicating a bandwidth combination supported for all bands of the inter-band EN-DC and the intra-band EN-DC of the first RAT and the second RAT for dual connectivity of the first RAT and the second RAT, wherein the dual connectivity is composed of the inter-band EN-DC and the intra-band EN-DC of the first RAT and the second RAT, in which, for the band combination of the inter-band EN-DC, any combination of the second RAT's part of the bandwidth combination indicated by the second parameter and the first RAT's part of the bandwidth combination indicated by the first parameter is supported, and a transmitting unit that transmits terminal capability information including the determined first parameter and the determined second parameter to the base station device.

Effect of the Invention

According to the disclosed technology, the user equipment can indicate, to the base station device, information related to a band combination of dual connectivity even in a wireless communication system in which multiple RATs are used.

BRIEF DESCRIPTION OF DRAWINGS

FIG. 3A is a diagram illustrating an indication example (1 of 2) of a bandwidth combination for a band combination of inter-band EN-DC and intra-band EN-DC;

FIG. 3B is a diagram illustrating an indication example (1 of 2) of a bandwidth combination for a band combination of inter-band EN-DC and intra-band EN-DC;

FIG. 3C is a diagram illustrating an indication example (1 of 2) of a bandwidth combination for a band combination of inter-band EN-DC and intra-band EN-DC;

FIG. 3D is a diagram illustrating an indication example (1 of 2) of a bandwidth combination for a band combination of inter-band EN-DC and intra-band EN-DC;

Figure 4E:
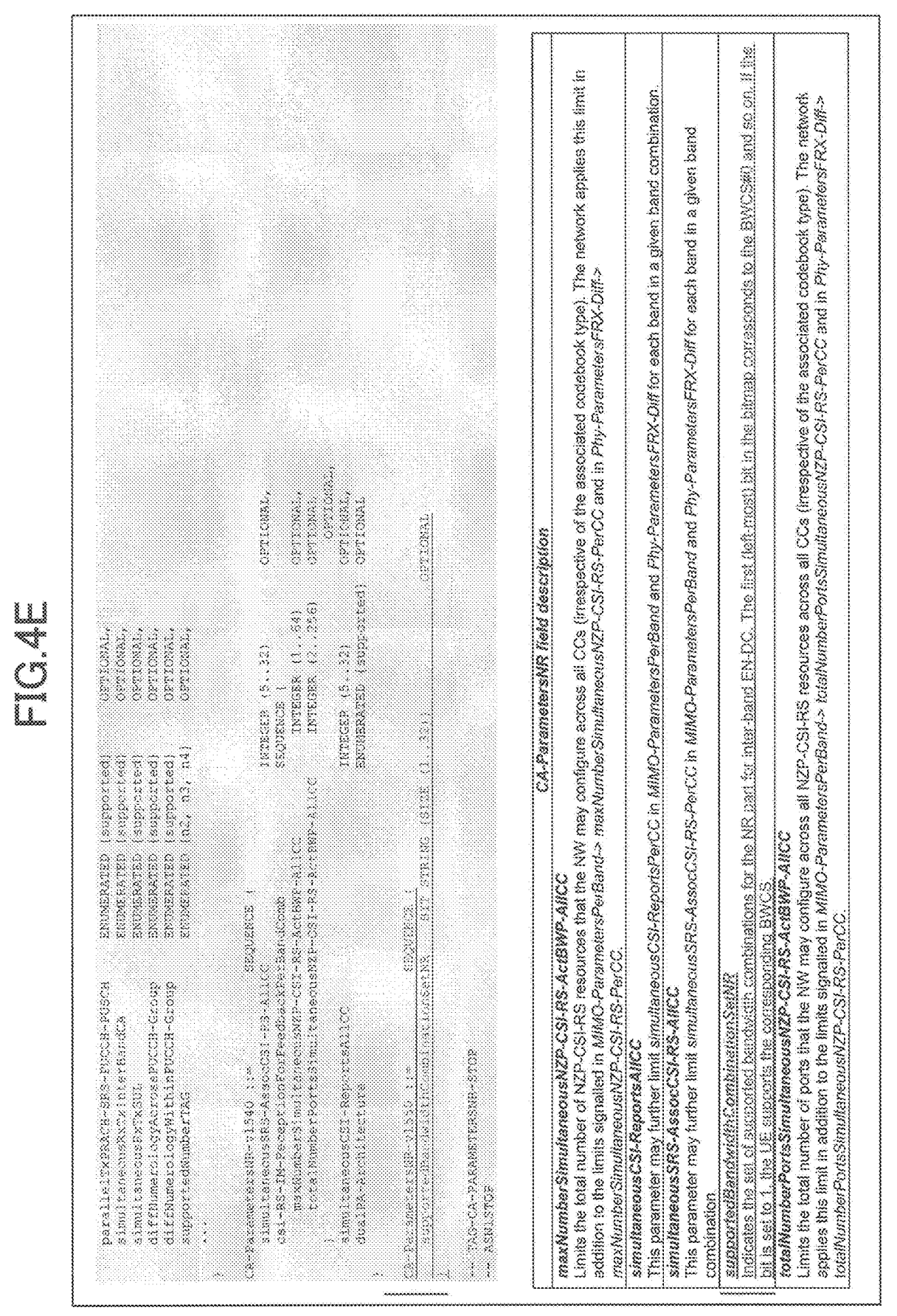

FIG. 4A is a diagram illustrating an indication example (2 of 2) of a bandwidth combination for a band combination of inter-band EN-DC and intra-band EN-DC;

FIG. 4B is a diagram illustrating an indication example (2 of 2) of a bandwidth combination for a band combination of inter-band EN-DC and intra-band EN-DC;

FIG. 4C is a diagram illustrating an indication example (2 of 2) of a bandwidth combination for a band combination of inter-band EN-DC and intra-band EN-DC;

FIG. 4D is a diagram illustrating an indication example (2 of 2) of a bandwidth combination for a band combination of inter-band EN-DC and intra-band EN-DC;

FIG. 4E is a diagram illustrating an indication example (2 of 2) of a bandwidth combination for a band combination of inter-band EN-DC and intra-band EN-DC;

MODE(S) FOR CARRYING OUT THE INVENTION

Hereinafter, exemplary embodiments of the present invention will be described with reference to the appended drawings.

Figure 1:
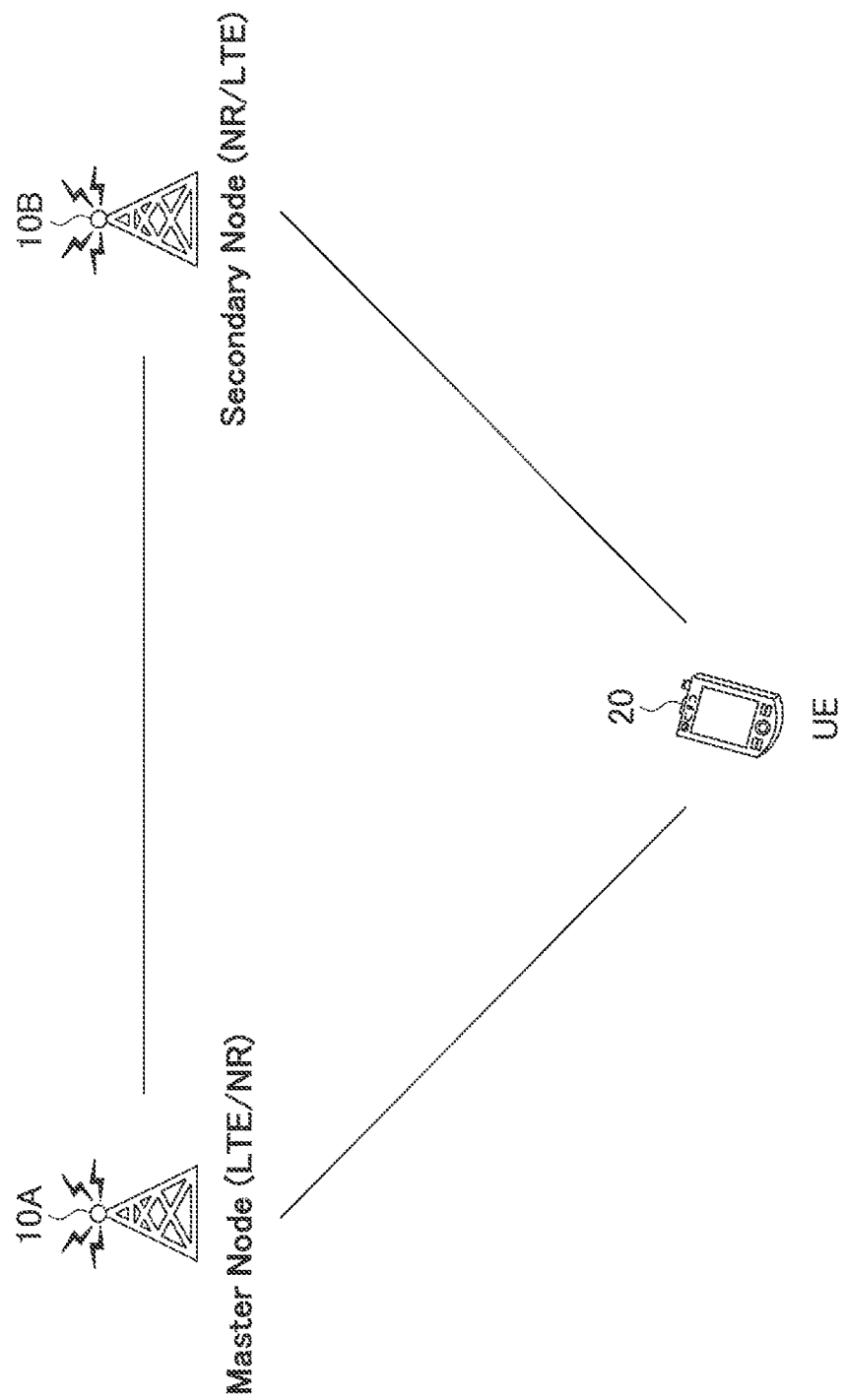
FIG. 1 illustrates a configuration example of a wireless communication system according to an embodiment of the present invention.

FIG. 1 illustrates a configuration example of a wireless communication system according to an embodiment of the present invention.

As illustrated in FIG. 1, a user equipment 20 is connected with a base station device 10A and a base station device 10B respectively provided by the LTE system and the NR system (hereinafter, the base station device 10A and the base station device 10B are also referred to as a "base station device 10" when not distinguished from each other) for communication, and supports LTE-NR dual connectivity (also referred to as EN-DC) in which the base station device 10A serves as a master base station, and the base station device 10B serves as a secondary base station. In other words, the user equipment 20 can perform simultaneous transmission or simultaneous reception with the master base station device 10A and the secondary base station device 10B by simultaneously using a plurality of component carriers provided by the master base station device 10A and the secondary base station device 10B. In the illustrated example, each of the LTE system and the NR system has only one base station, but a plurality of base stations are generally arranged to cover the service areas of the LTE system and the NR system.

Further, the following embodiment will be described for LTE-NR dual connectivity (EN-DC), but it would be understood by those skilled in the art that the user equipment according to the present disclosure is not limited thereto and can be applied, for example, to NR-LTE dual connectivity (also referred to as NE-DC) in which the base station device 10A of the NR system serves as the master base station, and the base station device 10B of the LTE system serves as the secondary base station and can be applied to dual connectivity between a plurality of wireless communication systems using different RATs, that is, MR-DC.

Figure 2:
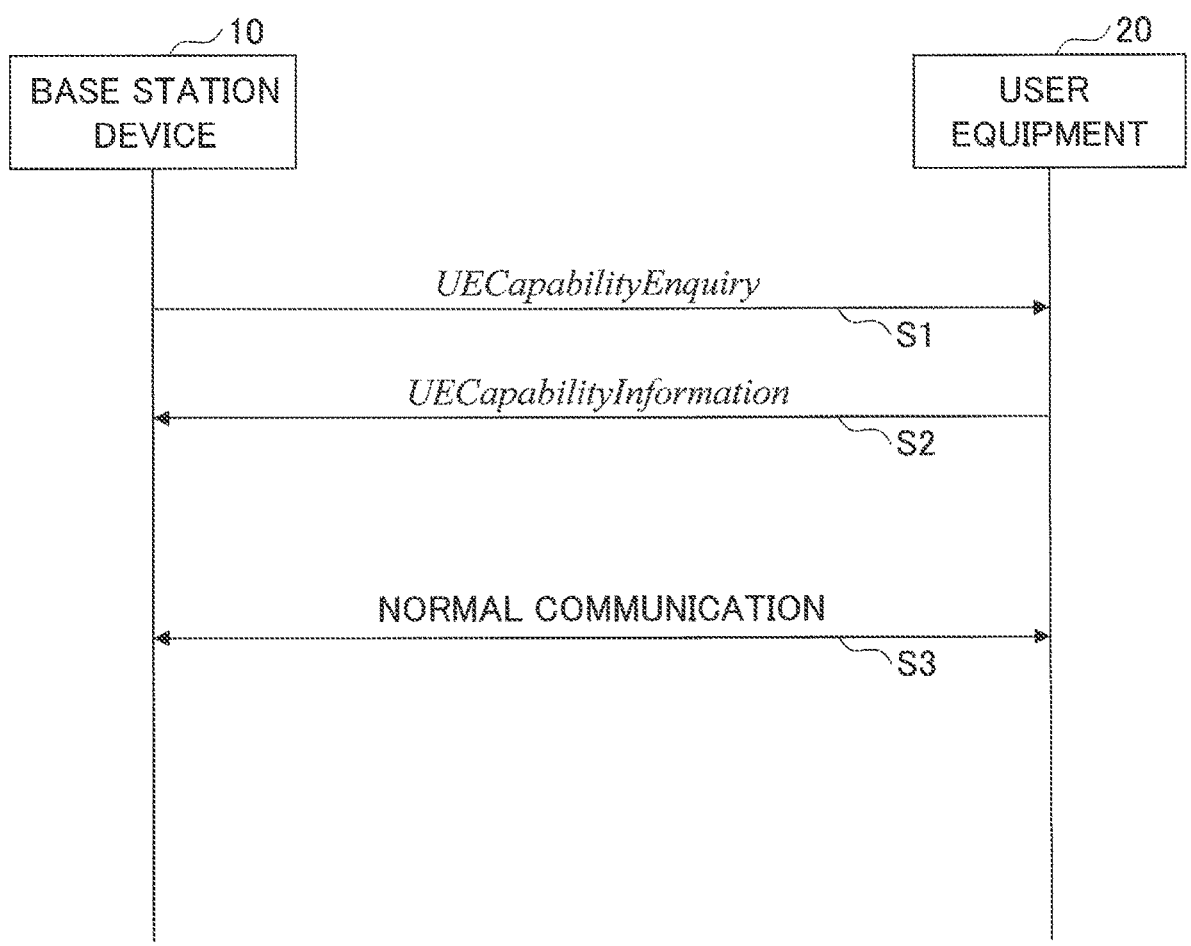
FIG. 2 is a sequence diagram in which a user equipment 20 according to an embodiment of the present invention transmits a capability indication to a base station device 10.

FIG. 2 is a sequence diagram in which the user equipment 20 according to an embodiment of the present invention transmits a terminal capability indication to the base station device 10. In FIG. 2, the base station device 10 transmits a terminal capability indication request to the user equipment 20, and the user equipment 20 transmits a terminal capability indication to the base station device 10 in response to the terminal capability indication request.

In step S1, the base station device 10 transmits a radio resource control (RRC) message "UECapabilityEnquiry" to the user equipment 20 as the terminal capability indication request. UECapabilityEnquiry is used to acquire information related to the radio access capability of the user equipment 20 via the network. The base station device 10 can designate a type of radio access capability included in the information to be indicated by the user equipment 20 through UECapabilityEnquiry. For example, the base station device 10 may request an indication of the radio access capability related to the bandwidth combination supported by the user equipment 20. Further, the base station device 10 may request an indication of the bandwidth combination supported by the user equipment 20 for the band combination configured with bands included in a list "requestedFreqBandList" to be indicated to the user equipment 20.

Then, in step S2, the user equipment 20 transmits an RRC message "UECapabilityInformation" to the base station device 10 as the terminal capability indication. UECapabilityInformation is used to indicate, to the network, information related to the radio access capability of the user equipment 20. The user equipment 20 transmits information related to the radio access capability supported by the user equipment 20 to the base station device 10 on the basis of the UECapabilityEnquiry received from the base station device 10 in step S1.

In step S3, the base station device 10 performs normal communication adapted to the terminal capability by UECapabilityInformation received from the user equipment 20 in step S2. For example, if UECapabilityInformation received from the user equipment 20 in step S2 includes a supported bandwidth combination, the base station device 10 performs scheduling within the supported bandwidth combination.

First Embodiment

FIG. 3A, FIG. 3B, FIG. 3C, and FIG. 3D are diagrams illustrating an indication example (1/2) of the bandwidth combination for the band combination of the inter-band EN-DC and the intra-band EN-DC.

As illustrated in FIG. 3A, FIG. 3B, FIG. 3C, and FIG. 3D, BandCombinationList which is a parameter for indicating bandwidth combination supported by the user equipment 20 is included as one of terminal capability information elements transmitted from the user equipment 20 to the base station device 10. A field supportedBandwidthCombinationSet for indicating the bandwidth combination supported by the user equipment 20 is included in BandCombinationList. supportedBandwidthCombinationSet is a bitmap with a maximum of 32 bits, and the user equipment 20 can indicate a maximum of 32 bandwidth combinations supported by the user equipment 20.

For NR standalone (NR SA) and the inter-band EN-DC, a bandwidth combination for an NR part of the band combination is configured in this field "supportedBandwidthCombinationSet."

Also, for the intra-band EN-DC, a bandwidth combination (supported bandwidth combination set) (supported BWCS) supported by the user equipment 20 and applicable to the band combinations of NR and LTE is configured in this field "supportedBandwidthCombinationSet." For example, a first bit (leftmost bit) of the bitmap of supportedBandwidthCombinationSet corresponds to a bandwidth combination #0 (BWCS #0), and a second bit corresponds to a bandwidth combination #1 (BWCS #1). In a case in which a bit is set to 1, the user equipment 20 supports a corresponding bandwidth combination.

For the band combination of the inter-band EN-DC, the user equipment 20 may support any combination of the NR part of the bandwidth combination indicated by this field and an E-UTRA part of the bandwidth combination indicated by the parameter supportedBandwidthCombinationSetEUTRA.

Further, the parameter supportedBandwidthCombinationSetEUTRA is a field included in CA-ParametersEUTRA which is one of the terminal capability information elements transmitted from the user equipment 20 to the base station device 10.

For the band combination of the EN-DC configured with the inter-band EN-DC and the intra-band EN-DC, this field indicates the bandwidth combination supported by the user equipment 20 between bands and across all bands of the intra-band EN-DC (in which all bands are considered).

Second Embodiment

FIG. 4A, FIG. 4B, FIG. 4C, FIG. 4D, and FIG. 4E are diagrams illustrating an indication example (2/2) of the bandwidth combination for the band combination of the inter-band EN-DC and the intra-band EN-DC.

As illustrated in FIG. 4A, FIG. 4B, FIG. 4C, FIG. 4D, and FIG. 4E, supportedBandwidthCombinationSetIntraMRDC which is a field for indicating the bandwidth combination supported by the user equipment 20 for the band combination of the intra-band MR-DC is included in BandCombinationList which is a parameter for indicating the bandwidth combination supported by the user equipment 20.

For the intra-band EN-DC, the bandwidth combination supported by the user equipment 20 that can be applied to the band combination of NR and LTE is configured in this field. For example, a first bit (leftmost bit) of the bitmap of supportedBandwidthCombinationSetIntraMRDC corresponds to a bandwidth combination #0 (BWCS #0), and a second bit corresponds to a bandwidth combination #1 (BWCS #1). In a case in which a bit is set to 1, the user equipment 20 supports a corresponding bandwidth combination.

For the band combination of the EN-DC configured with the inter-band EN-DC and the intra-band EN-DC, this field indicates the bandwidth combination supported by the user equipment 20 between bands and across all bands of the intra-band EN-DC (in which all bands are considered).

For the band combination of the inter-band EN-DC, the supported bandwidth combination is any combination of the NR part of the bandwidth combination indicated by supportedBandwidthCombinationSetNR and the E-UTRA part of the bandwidth combination indicated by supportedBandwidthCombinationSetEUTRA.

Note that parameter supportedBandwidthCombinationEUTRA is a field included in CA-ParametersEUTRA, which is one of terminal capability information elements transmitted from the user equipment 20 to the base station device 10.

Further, the parameter supportedBandwidthCombinationSetNR is a field included in CA-ParametersNR which is one of the terminal capability information elements transmitted from the user equipment 20 to the base station device 10. The name of the parameter is not limited to supportedBandwidthCombinationSetNR but may be any other name.

(Device Configuration)

Next, a functional configuration example of the base station device 10 and the user equipment 20 that performs the processes and the operations described above will be described. Each of the base station device 10 and the user equipment 20 has a function of carrying out at least the embodiment. Here, each of the base station device 10 and the user equipment 20 may have only some functions in the embodiment.

Figure 5:
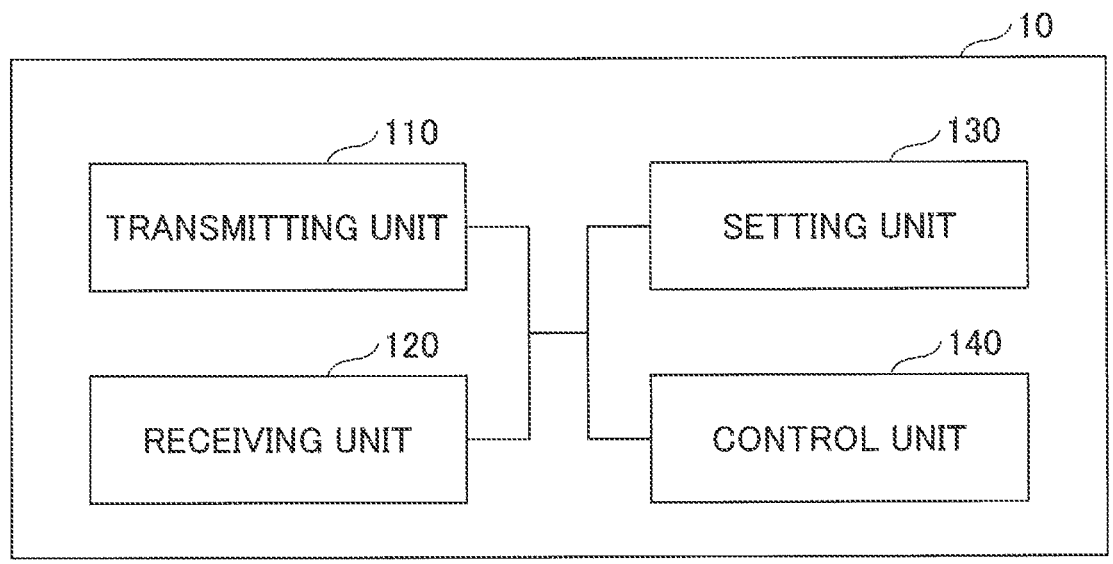
FIG. 5 is a diagram illustrating an example of a functional configuration of a base station device 10 according to an embodiment of the present invention.

FIG. 5 illustrates an example of a functional configuration of the base station device 10. As illustrated in FIG. 5, the base station device 10 includes a transmitting unit 110, a receiving unit 120, a setting unit 130, and a control unit 140. The functional configuration illustrated in FIG. 5 is only an example. A functional classification and names of the functional unit may be any classification and any names as long as the operation according to an embodiment of the present invention can be executed.

The transmitting unit 110 includes a function of generating a signal to be transmitted to the user equipment 20 side and transmitting the signal wirelessly. The receiving unit 120 includes a function of receiving various kinds of signals transmitted from the user equipment 20 and acquiring, for example, higher layer information from the received signals. Also, the transmitting unit 110 transmits a message for performing the terminal capability indication request to the user equipment 20 and information indicating scheduling of UL or DL, and the receiving unit 120 receives a message related to the terminal capability indication from the user equipment 20.

The setting unit 130 stores configuration information configured in advance and various kinds of configuration information to be transmitted to the user equipment 20. For example, content of the configuration information is information related to the band combination, information related to the terminal capabilities, or the like.

The control unit 140 receives the terminal capability indication request message to be transmitted to the user equipment 20 in the base station device 10 described in the embodiment, for example, control related to transmission of UECapabilityEnquiry, and the terminal capability indication from the user equipment 20, and performs control for executing communication corresponding to the capability.

Figure 6:
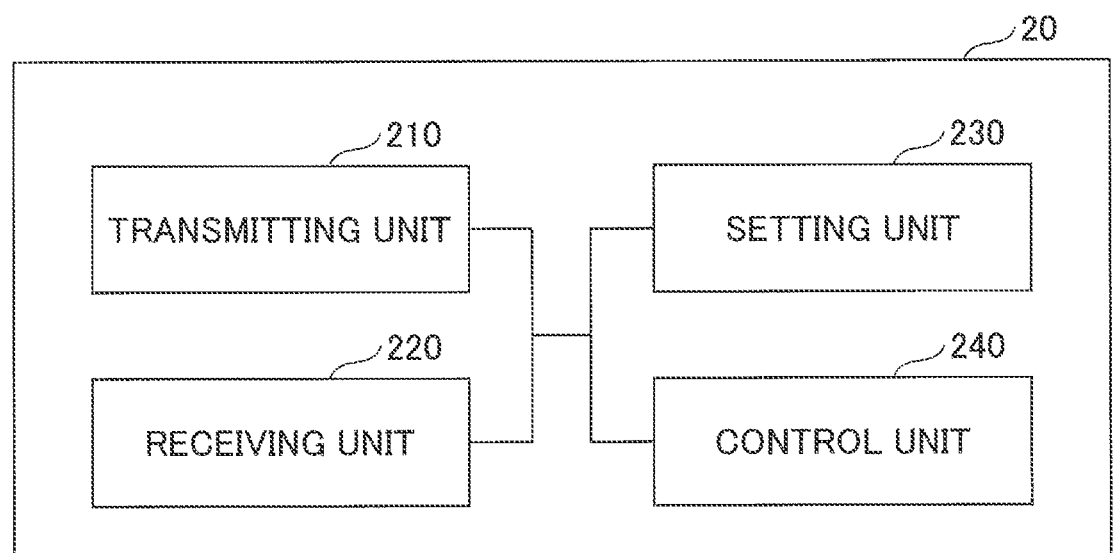
FIG. 6 is a diagram illustrating an example of a functional configuration of a user equipment 20 according to an embodiment of the present invention.

FIG. 6 is a diagram illustrating an example of a functional configuration of the user equipment 20. As illustrated in FIG. 6, the user equipment 20 includes a transmitting unit 210, a receiving unit 220, a setting unit 230, and a control unit 240. The functional configuration illustrated in FIG. 6 is only an example. A functional classification and names of the functional unit may be any classification and any names as long as the operation according to an embodiment of the present invention can be executed.

The transmitting unit 210 generates a transmission signal from the transmission data and transmits the transmission signal wirelessly. The receiving unit 220 wirelessly receives various kinds of signals and acquires a higher layer signal from a received physical layer signal. Further, the receiving unit 120 receives a message related to the terminal capability indication request from the base station device 10 and information indicating scheduling of UL or DL.

The setting unit 230 stores various kinds of configuration information received from the base station device 10 by the receiving unit 220. The setting unit 230 also stores configuration information configured in advance. For example, content of the configuration information is information related to the band combination, information related to the terminal capability indication, or the like.

The control unit 240 performs control related to generation and transmission of the terminal capability indication message transmitted from the user equipment 20 to the base station device 10, for example, UECapabilityInformation as described in the embodiment. Further, a functional unit related to transmission of the terminal capability indication message in the control unit 240 may be included in the transmitting unit 210, and a functional unit related to reception of the terminal capability indication request message in the control unit 240 may be included in the receiving unit 220.

(Hardware Configuration)

In the block diagrams (FIGS. 5 and 6) used for the description of the embodiment, the blocks of the functional units are illustrated. The functional blocks (configuring units) are implemented by an arbitrary combination of hardware and/or software. A device of implementing each functional block is not particularly limited. In other words, each functional block may be implemented by one device which is physically or logically combined or may be implemented by a plurality of devices, that is, two or more devices which are physically and/or logically separated and are directly or indirectly connected (for example, a wired and/or wireless manner). The function block may be implemented by combining software with the one device or the plurality of devices.

The functions include determining, deciding, judging, computing, calculating, processing, deriving, investigating, searching, confirming, receiving, transmitting, outputting, accessing, resolving, selecting, choosing, establishing, comparing, assuming, expectation, regarding, broadcasting, notifying, communicating, forwarding, configuring, reconfiguring, allocating, mapping, assigning, and the like but are not limited thereto. For example, a functional block (configuring unit) that causes transmission to function is referred to as a transmitting unit or a transmitter. In any case, as described above, an implementation method is not particularly limited.

Figure 7:
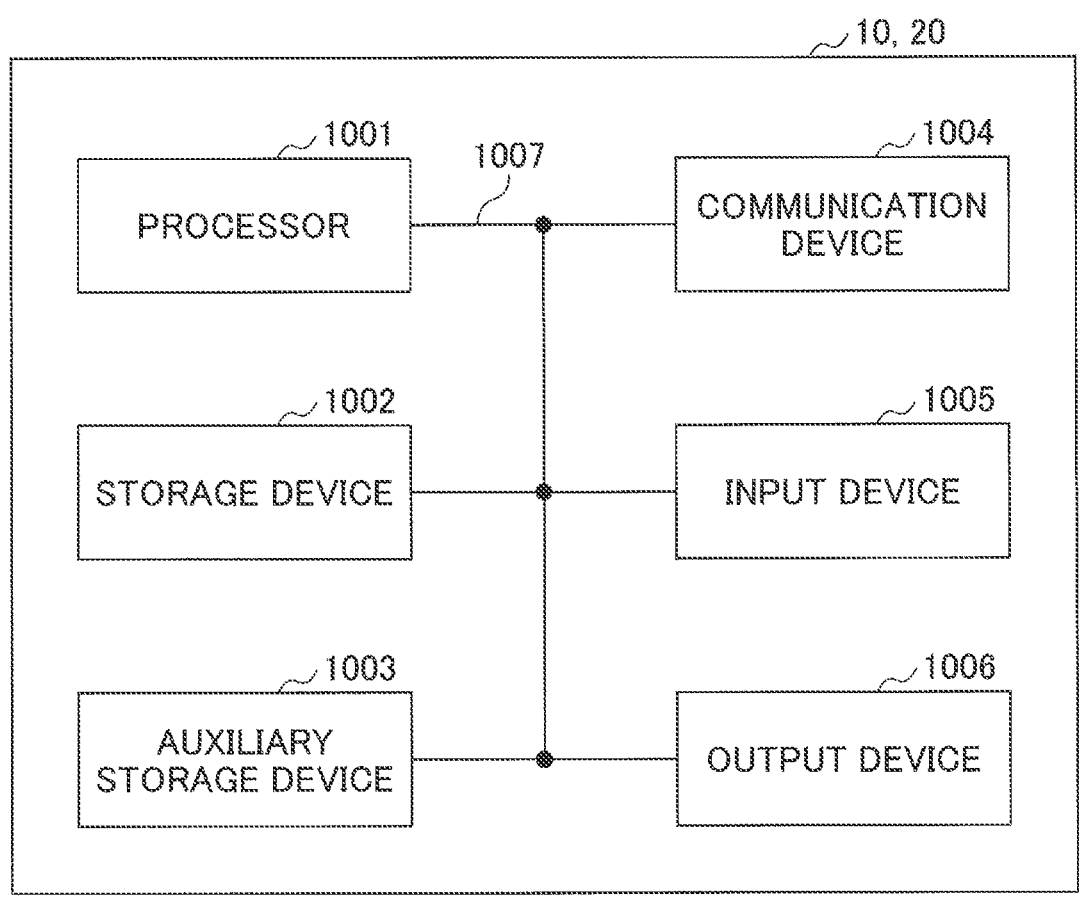
FIG. 7 is a diagram illustrating an example of a hardware configuration of the base station device 10 or the user equipment 20 according to an embodiment of the present invention.

For example, the base station device 10, the user equipment 20, or the like in one embodiment of the present disclosure may function as a computer for processing the present disclosure's wireless communication method. FIG. 7 is a diagram illustrating an example of a hardware configuration of the base station device 10 and the user equipment 20 according to an embodiment of the present disclosure. Each of the base station device 10 and the user equipment 20 may be physically configured as a computer device including a processor 1001, a storage device 1002, an auxiliary storage device 1003, a communication device 1004, an input device 1005, an output device 1006, a bus 1007, and the like.

In the following description, the term "device" can be read as a circuit, device, unit, or the like. The hardware configuration of each of the base station device 10 and the user equipment 20 may be configured to include one or more devices illustrated in the drawing or may be configured without including some devices.

Each function in each of the base station device 10 and the user equipment 20 is implemented such that predetermined software (program) is read on hardware such as the processor 1001 and the storage device 1002, and the processor 1001 performs an operation and controls communication by the communication device 1004 and reading and/or writing of data in the storage device 1002 and the auxiliary storage device 1003.

For example, the processor 1001 operates an operating system and controls the entire computer. The processor 1001 may be configured with a central processing unit (CPU) including an interface with a peripheral device, a control device, an operation device, a register, and the like. For example, the control unit 140, the control unit 240, and the like described above may be implemented by the processor 1001.

Further, the processor 1001 reads a program (program code), a software module, or data from at least one of the auxiliary storage device 1003 and/or the communication device 1004 out to the storage device 1002, and executes various types of processes according to them. A program causing a computer to execute at least some of the operations described in the above embodiment is used as the program. For example, the control unit 140 of the base station device 10 illustrated in FIG. 5 may be implemented by a control program which is stored in the storage device 1002 and operates on the processor 1001. Further, for example, the control unit 240 of the user equipment 20 illustrated in FIG. 6 may be implemented by a control program which is stored in the storage device 1002 and operates on the processor 1001. Various types of processes have been described as being performed by one processor 1001 but may be performed simultaneously or sequentially by two or more processors 1001. The processor 1001 may be implemented by one or more chips. The program may be transmitted from a network via an electric communication line.

The storage device 1002 is a computer readable recording medium and configured with at least one of a read only memory (ROM), an erasable programmable ROM (EPROM), an electrically erasable programmable ROM (EEPROM), a random access memory (RAM), and the like. The storage device 1002 is also referred to as a "register," a "cache," a "main memory," or the like. The storage device 1002 can store programs (program codes), software modules, or the like which are executable for carrying out the communication method according to an embodiment of the present disclosure.

The auxiliary storage device 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The auxiliary storage device 1003 may be referred to as an auxiliary storage device. The storage medium may be, for example, a database, a server, or any other appropriate medium including at least one of the storage device 1002 and the auxiliary storage device 1003.

The communication device 1004 is hardware (a transceiving device) for performing communication between computers via at least one of a wired network and a wireless network and is also referred to as a "network device," a "network controller," a "network card," a "communication module," or the like. The communication device 1004 may include a high-frequency switch, a duplexer, a filter, a frequency synthesizer, or the like in order to implement at least one of frequency division duplex (FDD) and time division duplex (TDD). For example, a transceiving antenna, an amplifying unit, a transmitting/receiving unit, a transmission line interface, or the like may be implemented by the communication device 1004. The transmitting/receiving unit may be implemented by to be physically or logically separated by a transmitting unit and a receiving unit.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs output to the outside. The input device 1005 and the output device 1006 may be integrated (for example, a touch panel).

The respective devices such as the processor 1001 and the storage device 1002 are connected via the bus 1007 to communicate information with each other. The bus 1007 may be configured with a single bus or may be configured with different buses between the devices.

Further, each of the base station device 10 and the user equipment 20 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented using at least one of these pieces of hardware.

Conclusion of First Embodiment

As described above, according to an embodiment of the present invention, a user equipment includes a receiving unit that receives band information of a first radio access technology (RAT) and a second RAT from a base station device, a control unit that determines a first parameter indicating a supported bandwidth combination (supported BWCS) for the first RAT's part for inter-band dual connectivity (inter-band EN-DC) of the first RAT and the second RAT and a second parameter indicating a bandwidth combination supported for all bands of the inter-band EN-DC and the intra-band EN-DC of the first RAT and the second RAT for dual connectivity of the first RAT and the second RAT, wherein the dual connectivity is composed of the inter-band EN-DC and the intra-band EN-DC of the first RAT and the second RAT, in which, for the band combination of the inter-band EN-DC, any combination of the second RAT's part of the bandwidth combination indicated by the second parameter and the first RAT's part of the bandwidth combination indicated by the first parameter is supported, and a transmitting unit that transmits terminal capability information including the determined first parameter and the determined second parameter to the base station device is provided.

With the above configuration, it is possible to indicate the bandwidth combination which can be applied to the dual connectivity executed in the wireless communication system in which multiple RATs are used.

Further, according to the embodiment of the present invention, a user equipment including a receiving unit that receives band information of a first radio access technology (RAT) and a second RAT from a base station device, a control unit that determines a first parameter indicating a supported bandwidth combination (supported BWCS) for the first RAT's part for inter-band dual connectivity (inter-band EN-DC) of the first RAT and the second RAT, a second parameter indicating a supported BWCS for the second RAT's part for intra-band dual connectivity (intra-band EN-DC) of the first RAT and the second RAT, and a third parameter indicating a supported BWCS applicable to the band combination of the first RAT and the second RAT, for the intra-band EN-DC, and indicating a supported BWCS for all bands of the inter-band EN-DC and the intra-band EN-DC of the first RAT and the second RAT for dual connectivity of the first RAT and the second RAT, wherein the dual connectivity is composed of the inter-band EN-DC and the intra-band EN-DC, in which, for the band combination of the inter-band EN-DC, any combination of the second RAT's part of BWCS indicated by the second parameter and the first RAT's part of BWCS indicated by the first parameter is supported, and a transmitting unit that transmits terminal capability information including the determined first parameter, the determined second parameter, and the determined third parameter to the base station device is provided.

With the above configuration, it is possible to indicate the bandwidth combination which can be applied to the dual connectivity executed in the wireless communication system in which multiple RATs are used.

Supplement of Embodiment

The exemplary embodiment of the present invention has been described above, but the disclosed invention is not limited to the above embodiments, and those skilled in the art would understand various modified examples, revised examples, alternative examples, substitution examples, and the like. In order to facilitate understanding of the invention, specific numerical value examples have been used for description, but the numerical values are merely examples, and certain suitable values may be used unless otherwise stated. The classification of items in the above description is not essential to the present invention, matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no inconsistency. For the sake of convenience of processing description, the base station device 10 and the user equipment 20 have been described using the functional block diagrams, but such devices may be implemented by hardware, software, or a combination thereof. Software executed by the processor included in the base station device 10 according to the embodiment of the present invention and software executed by the processor included in the user equipment 20 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Further, an indication of information is not limited to the aspect or embodiment described in the present disclosure and may be given by any other method. For example, the indication of information may be given by physical layer signaling (for example, downlink control information (DCI) or uplink control information (UCI)), upper layer signaling (for example, radio resource control (RRC) signaling, medium access control (MAC) signaling, broadcast information (master information block (MIB), system information block (SIB))), other signals, or a combination thereof. Further, the RRC signaling may be referred to as an RRC message and may be, for example, an RRC connection setup message, an RRC connection reconfiguration message, or the like.

Each aspect and embodiment of the present invention may be applied to at least one of Long Term Evolution (LTE), LTE-advanced (LTE-A), SUPER 3G, IMT-advanced, 4th generation mobile communication system (4G), 5th generation mobile communication system (5G), Future Radio Access (FRA), New Radio (NR), W-CDMA (registered trademark), GSM (registered trademark), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), a system using any other appropriate system, and next generation systems extended on the basis of these standards. Further, a plurality of systems may be combined and applied (for example, a combination of at least one of LTE and LTE-A and 5G or the like).

The processing procedures, the sequences, the flowcharts, and the like of the respective aspects/embodiments described in this specification may be reversed in order unless there is a contradiction. For example, the method described in the present disclosure presents elements of various steps using an exemplary order and is not limited to a presented specific order.

In this specification, a specific action that is supposed to be performed by the base station device 10 may be performed by an upper node in some cases. In the network including one or more network nodes including the base station device 10, various operations performed for communication with the user equipment 20 can be obviously performed by at least one of the base station and any network node (for example, an MME, an S-GW, or the like is considered, but it is not limited thereto) other than the base station device 10 and/or the base station device 10. The example in which the number of network nodes excluding the base station device 10 is one has been described above, but other network nodes in which a plurality of other network nodes (for example, an MME and an S-GW) are combined may be provided.

Information, a signal, or the like described in the present disclosure may be output from an upper layer (or a lower layer) to a lower layer (or an upper layer). Information, a signal, or the like described in the present disclosure may be input and output via a plurality of network nodes.

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination the present disclosure may be performed in accordance with a value (0 or 1) indicated by one bit, may be performed in accordance with a Boolean value (true or false), or may be performed by a comparison of numerical values (for example, a comparison with a predetermined value).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Further, software, commands, information, and the like may be transmitted and received via a transmission medium. For example, when software is transmitted from a web site, a server, or any other remote source using at least one of a wired technology (such as a coaxial cable, a fiber optic cable, a twisted pair, or a digital subscriber line (DSL)) and a radio technology (such as infrared rays or a microwave), at least one of the wired technology and the radio technology are included in a definition of a transmission medium.

Information, signals, and the like described in this specification may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or an arbitrary combination thereof.

The terms described in the present disclosure and terms necessary for understanding the present disclosure may be replaced with terms having the same or similar meanings. For example, at least one of a channel and a symbol may be a signal. Further, a signal may be a message. Further, a component carrier (CC) may be referred to as a "carrier frequency," a "cell," or the like.

The terms "system" and "network" used in the present disclosure are used interchangeably.

Further, information, parameters, and the like described in the present disclosure may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in the present disclosure. Since various channels (for example, a PUCCH, a PDCCH, and the like) and information elements can be identified by suitable names, various names allocated to the various channels and the information elements are not limited in any respect.

In the present disclosure, the terms "base station (BS)," "radio base station," "base station device," "fixed station," "Node B," "eNode B (eNB) gNodeB (gNB)," "access point," "transmission point," "reception point," "transmission/reception point," "cell," "sector," "cell group," "carrier," "component carrier," and the like can be used interchangeably. The base stations may also be indicated by terms such as a macro cell, a small cell, a femtocell, and a picocell.

The base station eNB can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (a remote radio head (RRH)). The term "cell" or "sector" refers to the whole or a part of the coverage area of at least one of the base station and the base station subsystem that performs a communication service in the coverage.

In the present disclosure, the terms "mobile station (MS)," "user terminal," "user equipment (UE)," "terminal," and the like can be used interchangeably.

The mobile station may be a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal. It may also be referred to as a remote terminal, handset, user agent, mobile client, client, or some other suitable term.

At least one of the base station and the mobile station may be also referred to as a transmitting device, a receiving device, a communication device, or the like. At least one of the base station and the mobile station may be a device installed in a mobile body, a mobile body itself, or the like. The moving body may be a vehicle (for example, a car, an airplane, or the like), a moving body that moves unmanned (for example, a drone, an autonomous car or the like), or a robot (manned type or unmanned type). At least one of the base station and the mobile station includes a device which need not necessarily move during a communication operation. For example, at least one of the base station and the mobile station may be an Internet of things (IoT) device such as a sensor.

The terms "determining" and "deciding" used in this specification may include a wide variety of actions. For example, "determining" and "deciding" may include, for example, events in which events such as judging, calculating, computing, processing, deriving, investigating, looking up, search, and inquiry (for example, looking up in a table, a database, or another data structure), or ascertaining are regarded as "determining" or "deciding." Further, "determining" and "deciding" may include, for example, events in which events such as receiving (for example, receiving information), transmitting (for example, transmitting information), input, output, or accessing (for example, accessing data in a memory) are regarded as "determining" or "deciding." Further, "determining" and "deciding" may include, for example, events in which events such as resolving, selecting, choosing, establishing, or comparing are regarded as "determining" or "deciding." In other words, "determining" and "deciding" may include events in which a certain operation is regarded as "determining" or "deciding." Further, "determining (deciding)" may be replaced with "assuming," "expecting," "considering," or the like.

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. For example, "connection" may be replaced with "access." In a case in which used in the present disclosure, two elements may be considered to be "connected" or "coupled" with each other using at least one of one or more electric wires, cables and/or a printed electrical connection or using electromagnetic energy having a wavelength in a radio frequency domain, a microwave region, or a light (both visible and invisible) region as non-limiting and non-exhaustive examples.

A reference signal may be abbreviated as RS and may be referred to as a pilot, depending on a standard to be applied.

A phrase "on the basis of" used in the present disclosure is not limited to "on the basis of only" unless otherwise stated. In other words, a phrase "on the basis of" means both "on the basis of only" and "on the basis of at least."

Any reference to an element using a designation such as "first," "second," or the like used in the present disclosure does not generally restrict quantities or an order of those elements. Such designations can be used in the present disclosure as a convenient method of distinguishing two or more elements. Thus, reference to the first and second elements does not mean that only two elements can be adopted there, or the first element must precede the second element in a certain form.

Further, "means" in the configuration of each of the above devices may be replaced with "unit," "circuit," "device," or the like.

In a case in which "include," "including," and variations thereof are used in the present disclosure, these terms are intended to be comprehensive, similarly to a term "comprising." Further, the term "or" used in the present disclosure is intended not to be an exclusive disjunction.

A radio frame may include one or more frames in the time domain. In the time domain, each of one or more frames may be referred to as a sub frame. The sub frame may further include one or more slots in the time domain. The sub frame may have a fixed time length (for example, 1 ms) not depending on numerology.

The numerology may be a communication parameter applied to at least one of transmission and reception of a certain signal or channel. For example, the numerology may indicate at least one of a sub carrier spacing (SCS), a bandwidth, a symbol length, a cyclic prefix length, a transmission time interval (TTI), a number of symbols per TTI, a radio frame configuration, a specific filtering process performed in the frequency domain by a transceiver, a specific windowing process performed in the time domain by a transceiver, and the like.

The slot may include one or more symbols (orthogonal frequency division multiplexing (OFDM) symbols, single carrier frequency division multiple access (SC-FDMA) symbols, or the like) in the time domain. The slot may be a time unit based on the numerology.

The slot may include a plurality of mini slots. Each mini slot may include one or more symbols in the time domain. Further, the mini slot may be referred to as a sub-slot. The mini slot may include fewer symbols than a slot. A PDSCH (or PUSCH) transmitted in units of times greater than the mini slot may be referred to as a PDSCH (or PUSCH) mapping type A. A PDSCH (or PUSCH) transmitted using a mini slot may be referred to as a PDSCH (or PUSCH) mapping type B.

All of a radio frame, a sub frame, a slot, a mini slot, and a symbol indicates a time unit for transmitting a signal. As a radio frame, a sub frame, a slot, a mini slot, and a symbol, different designations respectively corresponding to them may be used.

For example, one sub frame may be referred to as a transmission time interval (TTI: Transmission Time Interval), or a plurality of consecutive sub frames may be referred to as TTIs, or one slot or one mini slot may be referred to as a TTI. In other words, at least one of the sub frame and the TTI may be a sub frame (1 ms) in the existing LTE, may be a period shorter than 1 ms (for example, 1 to 13 symbols), or may be referred to as a period longer than 1 ms. A unit representing the TTI may be referred to as slot, a mini slot, or the like instead of the sub frame.

Here, for example, the TTI refers to a minimum time unit of scheduling in wireless communication. For example, in the LTE system, the base station performs scheduling of allocating a radio resource (a frequency bandwidth, a transmission power, or the like which can be used in each user equipment 20) to each user equipment 20 in units of TTIs. The definition of the TTI is not limited thereto.

The TTI may be a transmission time unit such as a channel coded data packet (transport block), a code block, or a code word, or may be a processing unit such as scheduling or link adaptation. Further, when a TTI is given, a time interval (for example, the number of symbols) in which a transport block, a code block, a code word, or the like is actually mapped may be shorter than the TTI.

Further, when one slot or one mini slot is referred to as a TTI, one or more TTIs (that is, one or more slots or one or more mini slots) may be a minimum time unit of scheduling. Further, the number of slots (the number of mini slots) constituting the minimum time unit of scheduling may be controlled.

A TTI having a time length of 1 ms may be referred to as a common TTI (TTI in LTE Rel. 8 to 12), a normal TTI, a long TTI, a common sub frame, a normal sub frame, a long sub frame, a slot, or the like. A TTI shorter than the common TTI may be referred to as a reduced TTI, a short TTI, a partial TTI (a partial or fractional TTI), a reduced sub frame, a short sub frame, a mini slot, a sub slot, a slot, or the like.

Further, a long TTI (for example, a common TTI, a sub frame, or the like) may be replaced with a TTI having a time length exceeding 1 ms, and a short TTI (for example, a reduced TTI or the like) may be replaced with a TTI having a TTI length which is less than a TTI length of a long TTI and equal to or more than 1 ms.

The resource block (RB) is a resource allocation unit in the time domain and the frequency domain and may include one or more consecutive subcarriers in the frequency domain. The number of sub carriers included in an RB may be the same irrespective of a numerology and may be, for example, 12. The number of sub carriers included in an RB may be decided on the basis of a numerology.

Further, a time domain of an RB may include one or more symbols and may be a length of one slot, one mini slot, one sub frame, or one TTI. Each of one TTI, one sub frame, or the like may be constituted by one or more resource blocks.

Further, one or more RBs may be referred to as a physical resource block (PRB), a sub carrier group (SCG), a resource element group (REG), a PRB pair, an RB pair, or the like.

Further, the resource block may be constituted by one or more resource elements (RE). For example, one RE may be a radio resource region of one subcarrier and one symbol.

A bandwidth part (BWP) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a UE, one or more BWPs may be configured within one carrier.

At least one of configured BWPs may be active, and it may not be assumed that the UE transmits and receives a predetermined signal/channel outside an active BWP. Further, a "cell," a "carrier," or the like in the present disclosure may be replaced with a "BWP."

Structures of the radio frame, the sub frame, slot, the mini slot, and the symbol are merely examples. For example, configurations such as the number of sub frames included in a radio frame, the number of slots per sub frame or radio frame, the number of mini slots included in a slot, the number of symbols and RBs included in a slot or a mini slot, the number of sub carriers included in an RB, the number of symbols in a TTI, a symbol length, a cyclic prefix (CP) length, and the like can be variously changed.

In the entire present disclosure, for example, when an article such as "a," "an," or "the" in English is added by a translation, the present disclosure may include a case in which a noun following the article is the plural.

In the present disclosure, a term "A and B are different" may mean "A and B are different from each other." Further, the term may mean "each of A and B is different from C." Terms such as "separated," "coupled," or the like may also be interpreted in similarly to "different."

Each aspect/embodiment described in this specification may be used alone, in combination, or may be switched in accordance with the execution. Further, indication of predetermined information (for example, indication of "being X") is not limited to a method that is explicitly performed, and may also be made implicitly (e.g. "no indication of the predetermined information").

In the present disclosure, the transmitting unit 210 and the receiving unit 220 are examples of communication units. MN is an example of the first the base station device. SN is an example of the second the base station device.

Further, in the present disclosure, supportedBandwidthCombinationSetEUTRA is an example of a first parameter, supportedBandwidthCombinationSet and supportedBandwidthCombinationSetNR are examples of a second parameter, and supportedBandwidthCombinationSetIntraMRDC is an example of a third parameter.

LTE is an example of a first RAT, and NR is an example of a second RAT.

Although the present disclosure has been described above in detail, it is obvious to those skilled in the art that the present disclosure is not limited to the embodiments described in the present disclosure. The present disclosure may be implemented as revised and modified forms without departing from the gist and scope of the present disclosure as configured forth in claims. Therefore, the description of the present disclosure is for the purpose of illustration and does not have any restrictive meaning to the present disclosure.

EXPLANATIONS OF LETTERS OR NUMERALS

100 BASE STATION DEVICE
200 USER EQUIPMENT
110 TRANSMITTING UNIT
120 RECEIVING UNIT
130 SETTING UNIT
140 CONTROL UNIT
200 USER EQUIPMENT
210 TRANSMITTING UNIT
220 RECEIVING UNIT
230 SETTING UNIT
240 CONTROL UNIT
1001 PROCESSOR
1002 STORAGE DEVICE
1003 AUXILIARY STORAGE DEVICE
1004 COMMUNICATION DEVICE
1005 INPUT DEVICE
1006 OUTPUT DEVICE

The invention claimed is:

1. A terminal, comprising:
a receiving unit that receives first band information of a first radio access technology (RAT) and second band information of a second RAT from a base station;
a control unit that determines:
a first parameter being a bitmap, wherein one bit set to a value of one within the bitmap of the first parameter indicates a supported bandwidth combination of the first RAT for inter-band dual connectivity (inter-band EN-DC) of the first RAT and the second RAT;
a second parameter being a bitmap, wherein one bit set to a value of one within the bitmap of the second parameter indicates a supported bandwidth combination of the second RAT for the inter-band EN-DC of the first RAT and the second RAT; and
a third parameter being a bitmap, wherein one bit set to a value of one within the bitmap of the third parameter indicates a supported bandwidth combination for intra-band dual connectivity (intra-band EN-DC) of the first RAT and the second RAT; and
a transmitting unit that transmits terminal capability information including the determined first parameter, the determined second parameter, and the determined third parameter to the base station,
wherein the terminal supports, for a band combination of the inter-band EN-DC, the bandwidth combination of the first RAT indicated by the first parameter, the bandwidth combination of the second RAT indicated by the second parameter, and a bandwidth combination with respect to the band combination of the intra-band EN-DC indicated by the third parameter.

2. The terminal of claim 1, wherein the first parameter indicates the supported bandwidth combination for an NR part of inter-band EN-DC, and the second parameter indicates the supported bandwidth combination for an E-UTRA part of inter-band EN-DC.

3. A method of a terminal, comprising:
receiving first band information of a first radio access technology (RAT) and second band information of a second RAT from a base station;
determining:
a first parameter being a bitmap, wherein one bit set to a value of one within the bitmap of the first parameter indicates a supported bandwidth combination of the first RAT for inter-band dual connectivity (inter-band EN-DC) of the first RAT and the second RAT;
a second parameter being a bitmap, wherein one bit set to a value of one within the bitmap of the second parameter indicates a supported bandwidth combination of the second RAT for the inter-band EN-DC of the first RAT and the second RAT; and
a third parameter being a bitmap, wherein one bit set to a value of one within the bitmap of the third parameter indicates a supported bandwidth combination for intra-band dual connectivity (intra-band EN-DC) of the first RAT and the second RAT; and
transmitting terminal capability information including the determined first parameter, the determined second parameter, and the determined third parameter to the base station,
wherein the terminal supports, for a band combination of the inter-band EN-DC, the bandwidth combination of the first RAT indicated by the first parameter and the bandwidth combination of the second RAT indicated by the second parameter, and the bandwidth combination with respect to the band combination of the intra-band EN-DC indicated by the third parameter.

4. A base station comprising:
a transmitting unit that transmits first band information of a first radio access technology (RAT) and second band information of a second RAT to a terminal;
a receiving unit that receives, from the terminal, terminal capability information including:
a first parameter being a bitmap, wherein one bit set to a value of one within the bitmap of the first parameter indicates a supported bandwidth combination of the first RAT for inter-band dual connectivity (inter-band EN-DC) of the first RAT and the second RAT;
a second parameter being a bitmap, wherein one bit set to a value of one within the bitmap of the second parameter indicates a supported bandwidth combination of the second RAT for the inter-band EN-DC of the first RAT and the second RAT; and
a third parameter being a bitmap, wherein one bit set to a value of one within the bitmap of the third parameter indicates a supported bandwidth combination for intra-band dual connectivity (intra-band EN-DC) of the first RAT and the second RAT; and
wherein the terminal supports, for a band combination of the inter-band EN-DC, the bandwidth combination of the first RAT indicated by the first parameter, the bandwidth combination of the second RAT indicated by the second parameter, and the bandwidth combination with respect to the band combination of the intra-band EN-DC indicated by the third parameter.

5. A wireless communication system comprising: a terminal; and a base station, wherein
the terminal includes:
a receiving unit that receives first band information of a first radio access technology (RAT) and second band information of a second RAT from a base station;
a control unit that determines:
a first parameter being a bitmap, wherein one bit set to a value of one within the bitmap of the first parameter indicates a supported bandwidth combination of the first RAT for inter-band dual connectivity (inter-band EN-DC) of the first RAT and the second RAT;
a second parameter being a bitmap, wherein one bit set to a value of one within the bitmap of the second parameter indicates a supported bandwidth combination of the second RAT for the inter-band EN-DC of the first RAT and the second RAT; and
a third parameter being a bitmap, wherein one bit set to a value of one within the bitmap of the third parameter indicates a supported bandwidth combination for intra-band dual connectivity (intra-band EN-DC) of the first RAT and the second RAT; and
a transmitting unit that transmits terminal capability information including the determined first parameter, the determined second parameter, and the determined third parameter to the base station, and
the base station includes:
a transmitting unit that transmits first band information of a first radio access technology (RAT) and second band information of a second RAT to a terminal;
a receiving unit that receives, from the terminal, terminal capability information including the determined first parameter, the determined second parameter, and the determined third parameter; and
wherein the terminal supports, for a band combination of the inter-band EN-DC, the bandwidth combination of the first RAT indicated by the first parameter, the bandwidth combination of the second RAT indicated by the second parameter, and the bandwidth combination with respect to the band combination of the intra-band EN-DC indicated by the third parameter.

* * * * *